Oct. 30, 1934.　　　　J. J-M. GUEUX　　　　1,978,864
OPERATING MECHANISM FOR FEEDING APPARATUS FOR LIQUIDS
Filed Aug. 28, 1933　　　4 Sheets-Sheet 1
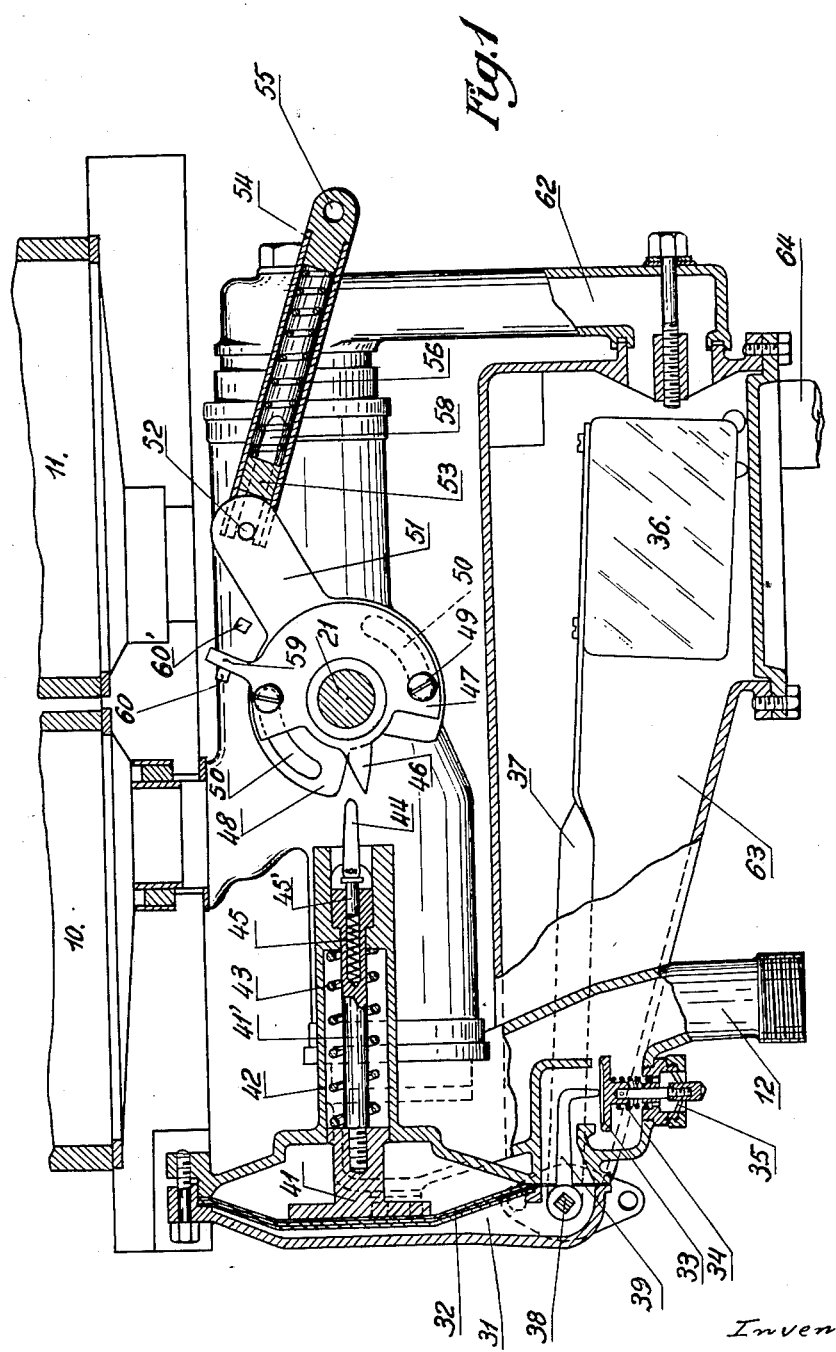
Inventor:
Joseph Jean-Marie Gueux Oct. 30, 1934.  J. J-M. GUEUX  1,978,864
OPERATING MECHANISM FOR FEEDING APPARATUS FOR LIQUIDS
Filed Aug. 28, 1933  4 Sheets-Sheet 2
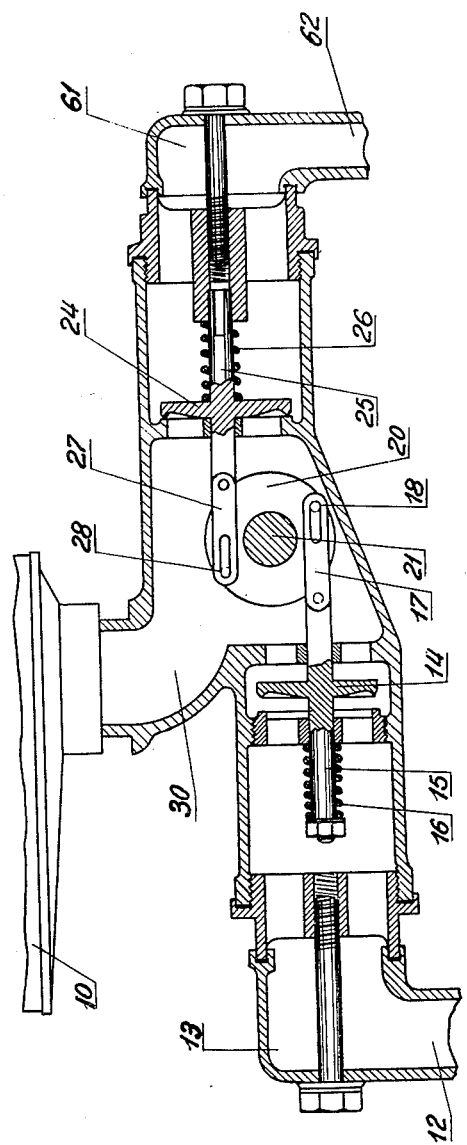
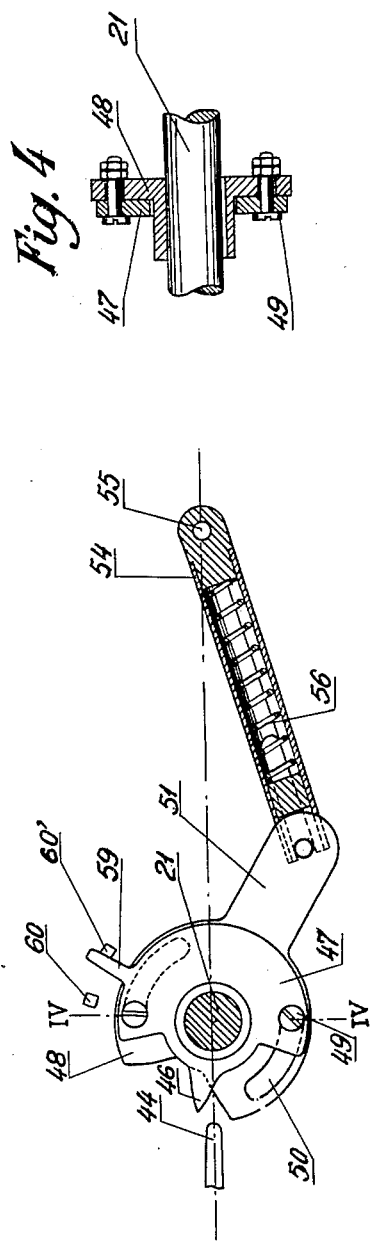
Inventor:
Joseph Jean-Marie Gueux

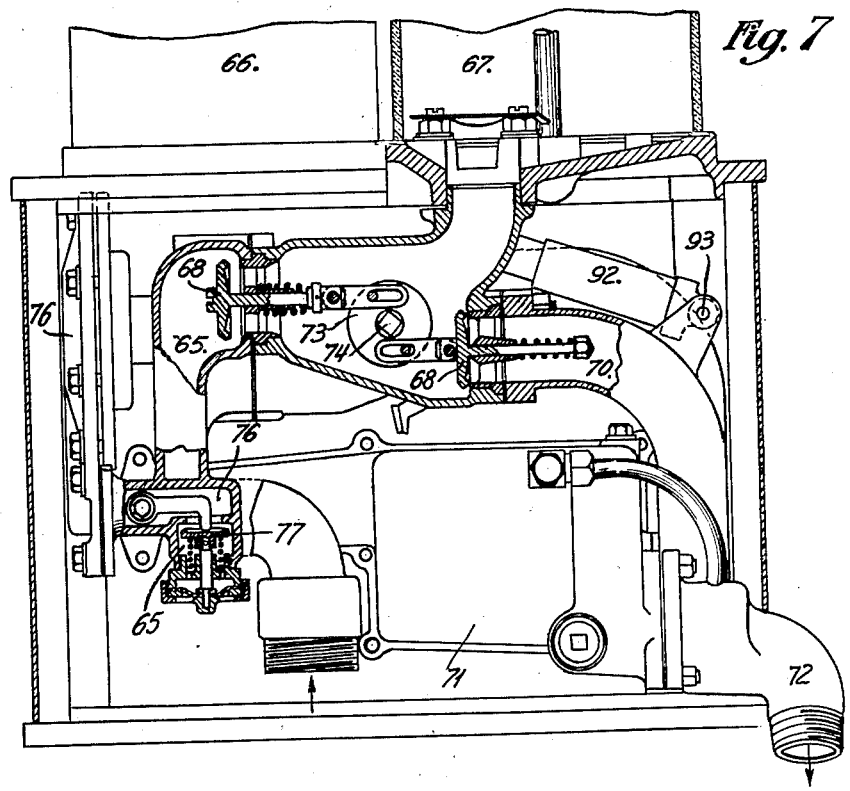
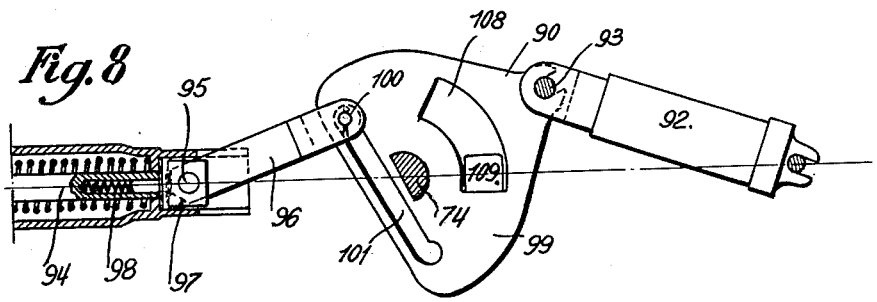
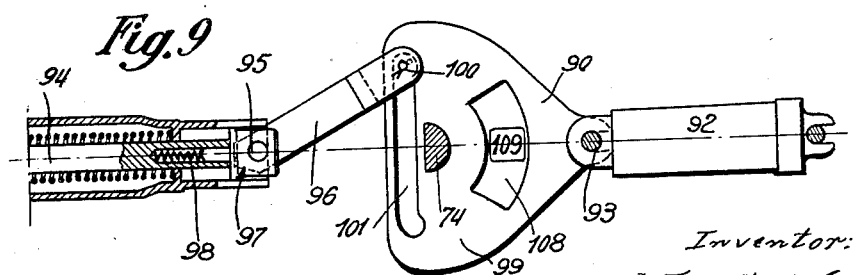

Patented Oct. 30, 1934

1,978,864

UNITED STATES PATENT OFFICE 1,978,864

OPERATING MECHANISM FOR FEEDING APPARATUS FOR LIQUIDS

Joseph Jean-Marie Gueux, Ivry-sur-Seine, France

Application August 28, 1933, Serial No. 687,238
In France September 22, 1932

6 Claims. (Cl. 221—100)

The present invention relates to feeding apparatus for liquids comprising two measuring vessels, which serve to deliver, in measured quantities, a liquid which is supplied by a pump or from a suitable source of pressure.

The invention has for its object to provide an operating mechanism which is adapted for use with such feeding apparatus, and which operates in an absolutely automatic manner, in such way that it is simply necessary to start the pump, in order that all required operations may be successively effected, without any attention on the part of the operator.

The automatic operation is effected by the use of a single diaphragm, which is urged by a reaction spring and is subjected on one of its faces to the pressure of the liquid supplied to the apparatus. This diaphragm is connected by a pushrod with a rocking mechanism provided with a spring-mounted toggle device which controls the valves for admission and discharge of the liquid for each of the measuring vessels.

The access of the liquid to the diaphragm is controlled by a valve which is operated by a float situated in a chamber communicating with the outlet conduit, in such way that the said diaphragm will be put out of action as long as any liquid remains in the said chamber.

The said invention is shown by way of example in the accompanying drawings.

Fig. 1 is a vertical section, partly in elevation, of one form of construction of the mechanism.

Fig. 2 is a vertical section, on a plane parallel with the section plane of Fig. 1.

Fig. 3 is an elevational view, showing the valve-controlling mechanism in a different position from the one shown in Fig. 1.

Fig. 4 is a section on the line IV—IV of Fig. 3.

Fig. 7 is a section, in elevation, according to another plane than the one indicated in Fig. 5.

Fig. 8 shows a modified construction of certain details, and

Fig. 9 indicates the same parts as shown in Fig. 8, when proceeding through the dead center.

Figure 5:
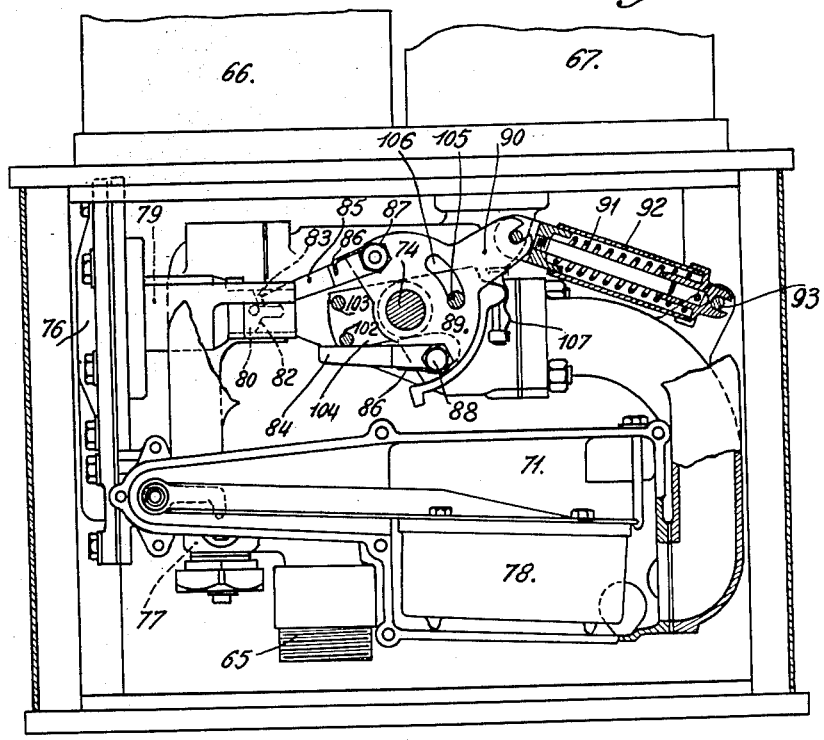
Fig. 5 is a section, in elevation, of a modified mechanism controlling the feeding apparatus.

The apparatus shown in Figs. 1 to 4 comprises a supply conduit 12 connected with a feeding pump (not shown) and leading to two general conduits which are respectively connected with two measuring vessels 10 and 11.

The figures represent only the general conduit 13 (Fig. 2) supplying the measuring vessel 10, the general conduit supplying the vessel 11 being arranged in a similar manner.

The general conduit 13 communicates, through a valve 14, with an intermediate chamber 30 connected with the vessel 10.

On the side next the discharge, the chamber 30 communicates, through a valve 24, with a general conduit 61 which is connected by a conduit 62 with a chamber 63, with which is also connected the outlet conduit corresponding to the measuring vessel 10. Leading from the chamber 63 is a conduit 64 which serves to discharge the liquid.

The respective guiding stems 15—25 of the valves 14—24, are provided with reaction springs 16—26 and are connected by slotted links 17—27 with studs 18—28 mounted on a common disc 20 fitted upon a shaft 21. This shaft is automatically operated, as will be further disclosed. The inlet and the outlet valves corresponding to the measuring vessel 11 are controlled, by means of the common shaft 21, by a device quite similar to the one just described.

For the automatic control of the shaft 21 acting upon the valves for the two measuring vessels, there is provided an elastic diaphragm 32 forming one wall of a chamber 31, and said chamber of variable volume communicates with the supply conduit 12 through a valve 33 provided with a reaction spring 34 and with an elastic diaphragm 35 forming a leakless joint.

A float 36, located in the chamber 63, is connected by a lever 37 with a shaft 38 carrying an arm 39, so arranged that when the float descends, the arm will push down the valve 33 and thus open the latter.

The diaphragm 32 is in contact with a piston 41 movable in a cylinder 42 and provided with a reaction spring 43. The piston 41 carries a pushrod 41' adapted to drive a tongue 44 which is urged into its middle position by a spring 45. For this purpose, a flat rod 45' is mounted between the spring 45 and the end of the tongue 44, which latter is correspondingly flattened.

Adjacent the tongue 44 is mounted a disc 47, having two cut-out parts which are separated by a tooth 46 whose faces may make contact with the tongue 44. The disc 47 is loose on the shaft 21 controlling the valves for the admission and the offtake of the liquid. The disc 47 carries an arm 59 whose motion is limited by two fixed stops 60—60'. A disc 48 is mounted parallel with the disc 47, and has a single cut-out part, said disc being keyed to the controlling shaft 21.

The two discs are secured together by screws 49 passing through arc-shaped slots 50 in the disc 48, thus providing for a certain relative angular displacement of the discs.

A toggle device serves to move the disc 48 into either one of its end positions. This device comprises an arm 51, mounted on the disc 48 and provided with a stud 52 slidable in slots 58 formed in a tube 54 which is pivotally mounted on the main frame at 55. A piston 53, movable in said tube and urged by a spring 56, presses upon the arm 51 and tends to separate it from the shaft 55.

The operation of the said apparatus is as follows:

The two measuring vessels 10 and 11 are supposed to be empty, and the different parts of the apparatus have the positions shown in Figs. 1 and 2. The valve 33 is kept open by the float 36, which rests on the bottom of the chamber 63. If the pump is set running, the liquid will enter the apparatus through the conduit 12, and thus reaches one of the admission conduits 13.

The valve 14 pertaining to the measuring vessel 10 being open, the liquid will enter the intermediate chamber 30 and will proceed thence into the vessel 10.

When this vessel has been filled up, a sudden excess of pressure is produced in the conduit 12, and as the valve 33 is open, the liquid fills the chamber 31 and abruptly pushes out the diaphragm 32. The piston 41 is thus moved to the right (Fig. 1), and the tongue 44 meets the tooth 46 of the loose disc 47, whose movement is limited by the stop 60 which retains the arm 59. This arm bears upon one face of the tooth 46, and enters one of the cut-out parts of the disc 47, which is held fast by the stop 60, thus displacing the disc 48, and the latter will turn, together with its attached shaft. During this rotation, when the stud 52 has moved beyond the plane passing through the axes of the shafts 21 and 55, the spring 56, which pushes out the piston 53 and the arm 51, will displace the disc 48, which thus occupies the position shown in Fig. 3. At the end of this movement, the disc 48 moves— by means of the screws 49—the disc 47, which thus causes the other face of the tooth 46 to coincide with the tongue 44, and this motion is limited by the contact between the arm 59 and the stop 60'.

For each stroke of the piston 41, the disc 48 and the shaft 21 rotate through about 60 degrees. The angular displacement of the disc 20 secured to the shaft 21, will effect—through the link 17— the closing of the inlet valve 14, and then— through the link 27—the opening of the outlet valve 24. On the other hand, the movement of the shaft 21 causes the closing of the outlet valve of the shaft ring vessel 11, and the opening of its inlet valve.

It will be further observed that between the end positions of the disc 20 there is a position in which the four valves which serve to supply and to empty the two measuring vessels, are closed.

As the outlet valve 24 of the vessel 10 is open, the liquid will enter the main conduit 62 and will partially fill the chamber 63. The float 36 rises, as well as the arms 37 and 39. The valve 33 which is thus released, is closed by the spring 34, and remains closed as long as the chamber 63 contains liquid.

Accordingly, even if the vessel 11 is full and the conduit 12 is under pressure, the diaphragm 32 will not be affected, but when the chamber 63 is empty, the float 36 descends, the valve 33 opens, and the diaphragm 32 impels the disc 48, which moves from the position shown in Fig. 3 to the position shown in Fig. 1.

It is thus observed that the operation is entirely automatic, and the only operations to be performed by the operator are the ones required to start the apparatus and to stop the pump.

Figure 6:
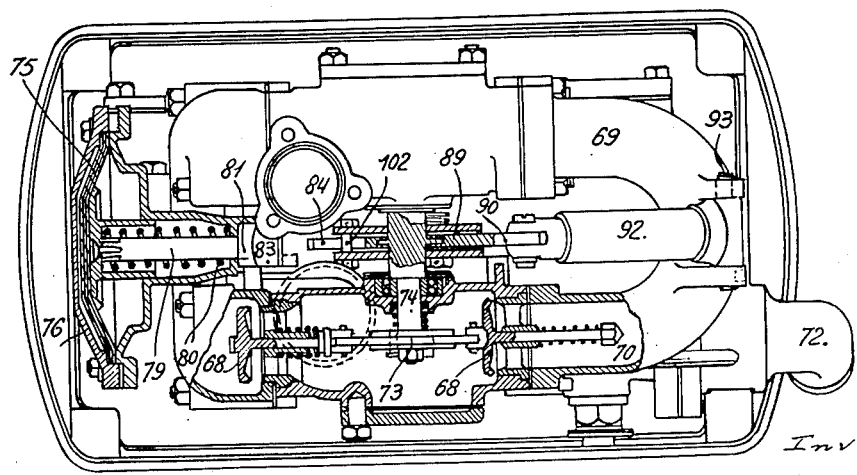
Fig. 6 is a corresponding plan view.

Figs. 5 to 7 show the major part of the devices already described; for instance, the supply conduit 65 which feeds the two measuring vessels 66—67 through the valves 68; also the two main discharge conduits 69—70 which are also controlled by the valves 68 and lead to a chamber 71, this being the starting point of the delivery conduit 72.

As in the preceding case, the stems of the four valves 68 are pivotally mounted on crank-discs 73 etc. keyed to a common shaft 74.

The apparatus further comprises a flexible diaphragm 75 forming one wall of a chamber 76 communicating with the supply conduit 65 through a valve 77 whose opening and closing depend upon the position of a float 78 located in the feeding chamber 71.

By its outer face, the diaphragm 75 acts upon a push-rod 79 which is perpendicular to the shaft 74 and is constantly urged away from this shaft by a spring 80. The said push-rod has a head 81 on which are formed two shoulders 82 and 83, cooperating with two arms 84—85 urged by a spring 86 and pivoted at 87—88 to a disc 89 keyed to the shaft 74.

As in the preceding case, the disc is acted upon by a toggle device, and for this purpose it carries an axial arm 90 whose end is urged by a spring 91 mounted in a tube 92 which is pivoted to an axle 93 pertaining to the main frame, and thus the said axle is located in a plane comprising the axes of the shaft 74 and of the push-rod 79; moreover, the line connecting the pivoting points 87 and 88 of the arms 84 and 85 is perpendicular to the direction of the arm 90.

The pivoting motion of the arms 84 and 85 is limited by respective stops 102 and 103 mounted on a rocker arm 104 which is loose on the shaft 74, but carries a stud 105 engaged in a slot 106 in the disc 89, and thus, at the end of the stroke of the disc, the rocker arm will be displaced, and one of its stops 102—103 will meet the corresponding arm 84 or 85 and will place it in the position in which it will engage the shoulder 82 or 83 of the push-rod during the succeeding movement.

A spring strip 107 maintains, to a certain degree, the rocker arm 104 in each of its two end positions.

The operation of the mechanism is analogous to what prevails for the preceding apparatus.

When one of the measuring vessels 66—67 is emptied the float 78 descends and hence opens the valve 77, and thus when the other vessel is filled the additional pressure produced in the feeding conduit 65 will also prevail in the chamber 76, thus displacing the diaphragm 75; the push-rod 79 approaches the shaft 74, and one of its shoulders 82 or 83 will push the corresponding arm 84 or 85. As the movement of the diaphragm and the push-rod continues, the disc 89 and the shaft 74 will rotate, thus compressing the spring 91 of the toggle device.

However, the movement will soon have proceeded beyond the dead center of the said toggle device, and the spring 91 will then expand, thus terminating the movement of the shaft 74, which—by means of the crank-discs 73—will simultaneously actuate the four valves 68 in such way as to empty the filled vessel and to fill the empty vessel.

The pressure will at once fall in the feeding conduit 65, and the push-rod 79 and the diaphragm 75 will be brought to their original positions by the spring 80.

When the diaphragm is again displaced, the shaft 74 will turn in the contrary direction, and will effect another operation for the reversal of the feeding device.

It is to be noted that between the two different positions for the opening of the valves, there will always exist a position for the entire closing of the four valves.

Figs. 8 and 9 relate to a modification of the device by which the push-rod is constantly connected with the disc mounted on the shaft. The push-rod 94 is herein actuated by the same diaphragm as before, but at its end is pivoted, on a spindle 95, a link 96 carrying at its other end a sliding member 100 engaged in a slot 101 in a disc 99 keyed to the shaft 74 and provided, as before, with an arm 90 which forms one of the parts of a toggle device.

The inner end of the link 96 comprises two flat parts 97 cooperating with a spring 98 contained in the push-rod 94, and the spring and the said flat parts form a small jointed device for the link 96, which device acts in the same manner as the aforesaid toggle device of the disc 99.

The direction of the slot 101 is perpendicular to the axis of the arm 90 of the toggle device, and the ends of the slot form notches by which the member 100 will be securely held in place, and especially at the start of its movement.

The disc 99 comprises a slot 108 having the form of a circular arc cooperating with a fixed stop 109 mounted on the main frame, whereby the pivoting motion of the disc is limited to about 60 degrees.

The operation is as follows (Figs. 8 and 9). When the push-rod 94 is displaced, the disc 99 and the shaft 74 are pivoted about, until they exceed the dead center of the toggle device 90—92, (Fig. 5). Then the disc 99 continues to move in this direction, and the push-rod 94 is returned to its original position.

The member 100 of the link 96 thus moves through the whole extent of the slot 101, and comes to its other end, and in this way it holds the several parts in a position in which they are prepared to turn the shaft 79 in the contrary direction to the preceding. The action of the spring 98 on the flat parts 97 will obviously further this movement of the link.

I claim as my invention:—

1. An apparatus for distributing and measuring liquids under pressure, comprising two measuring vessels, a supply conduit having two branches connecting it with the vessels, a distributing conduit also having two branches connected to the vessels, a valve in each branch, means including a rock shaft for connecting said valves whereby the valve in the supply branch for one vessel will be open when the valve in the distributing branch of said vessel is closed and the valves in the supply and distributing branches of the other vessel are closed and open, respectively, a chamber permanently connected to the inlet, a member responsive to change of pressure developed in said chamber upon filling of a vessel, said member being movable in one direction by said pressure, a spring urging said member in the opposite direction, and means operative under the control of repeated actuations of said member to alternate said shaft.

2. An apparatus for distributing and measuring liquids under pressure, comprising two measuring vessels, a supply conduit having two branches connecting it with the vessels, a distributing conduit also having two branches connected to the vessels, a valve in each branch, means including a rock shaft for connecting said valves whereby the valve in the supply branch for one vessel will be open when the valve in the distributing branch of said vessel is closed and the valves in the supply and distributing branches of the other vessel are closed and open, respectively, a chamber permanently connected to the inlet, a diaphragm in the wall of the chamber exposed to the pressure therein, a spring opposing the liquid pressure on the diaphragm and yielding in response to change of pressure developed in the chamber upon filling of a vessel, and means including a toggle for converting successive unidirectional movements of the diaphragm into alternating motion of the shaft.

3. An apparatus for distributing and measuring liquids under pressure, comprising two measuring vessels, a supply conduit having two branches connecting it with the vessels, a distributing conduit also having two branches connected to the vessels, a valve in each branch, means including a rock shaft for connecting said valves whereby the valve in the supply branch for one vessel will be open when the valve in the distributing branch of said vessel is closed and the valves in the supply and distributing branches of the other vessel are closed and open, respectively, a chamber permanently connected to the inlet, a reciprocating slide actuated in one direction by the change of pressure developed in said chamber upon filling of a vessel, and means for converting the linear reciprocation of said slide into alternating rotation of the shaft.

4. Apparatus according to claim 3, in which the motion conversion means comprises a disk on said shaft having oppositely inclined ramps, stop means defining the amplitude of rotation of the disk in both directions, a tongue moved by the reciprocating slide and cooperating with the said ramps, and means for alternating the cooperation of the ramps with the tongue.

5. Apparatus according to claim 1, comprising also a float in the distributing conduit, a stop valve between the inlet and the chamber, and connections between the float and the stop valve for closing the latter when the float is raised.

6. Apparatus according to claim 3, in which the shaft carries a disk with a slot therein and the slide is connected thereto by a link having one end movable in the slot and the other jointed to the slide, and in which the shaft is connected to a toggle in such a manner that the toggle passes through a dead center in each swing of the shaft.

JOSEPH JEAN-MARIE GUEUX.